United States Patent [19]
Yamanashi

[11] Patent Number: 5,194,991
[45] Date of Patent: Mar. 16, 1993

[54] ZOOM LENS SYSTEM

[75] Inventor: Takanori Yamanashi, Tokyo, Japan

[73] Assignee: Olympus Optical Co., Ltd., Tokyo, Japan

[21] Appl. No.: 566,825

[22] Filed: Aug. 14, 1990

[30] Foreign Application Priority Data

Aug. 15, 1989 [JP] Japan .................................. 1-209589

[51] Int. Cl.⁵ .............................................. G02B 15/22
[52] U.S. Cl. .................................. 359/693; 359/689; 359/700; 359/705
[58] Field of Search ................. 350/423, 428, 430; 359/689, 693, 700, 705, 708

[56] References Cited

U.S. PATENT DOCUMENTS

| | | | |
|---|---|---|---|
| 3,884,555 | 5/1975 | Suwa et al. | 359/693 |
| 4,348,082 | 9/1982 | Ogawa | 350/428 |
| 4,576,444 | 3/1986 | Kawamura | 359/693 |
| 4,786,153 | 11/1988 | Ogata | 350/430 |

FOREIGN PATENT DOCUMENTS 63-153511  6/1988  Japan .

Primary Examiner—Scott J. Sugarman
Attorney, Agent, or Firm—Cushman, Darby & Cushman

[57] ABSTRACT

A zoom lens system comprising a first lens unit having a positive refractive power, a second lens unit having a positive refractive power and a third lens unit having a negative refractive power, and is modifiable into a macro optical system for photographing an object located at an exceptionally short distance with favorable optical performance by varying the airspaces reserved among the lens units in a manner different from that for zooming.

11 Claims, 16 Drawing Sheets

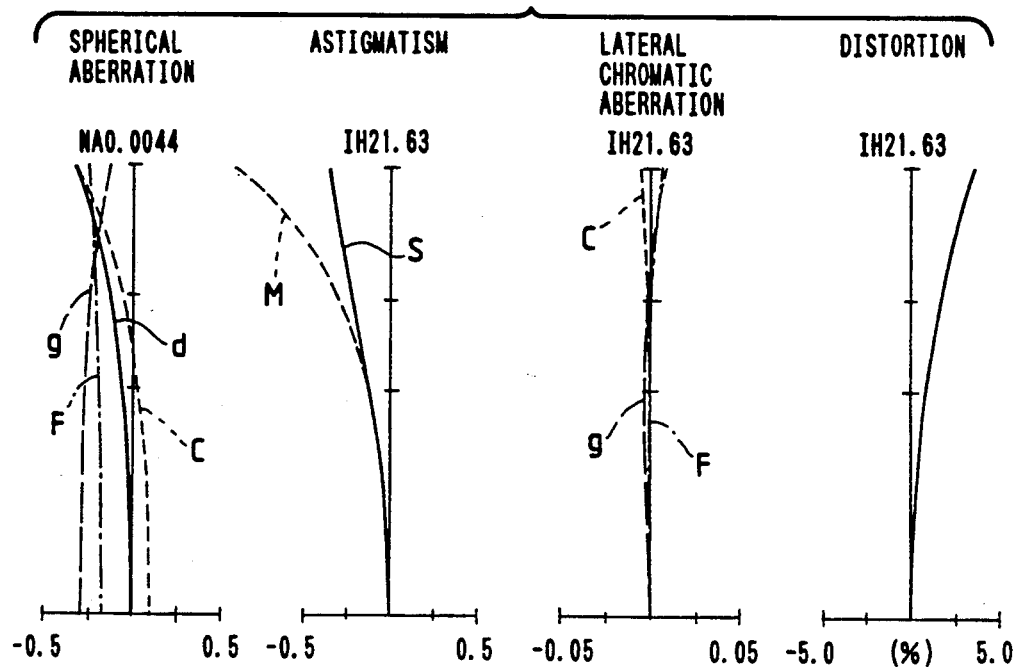
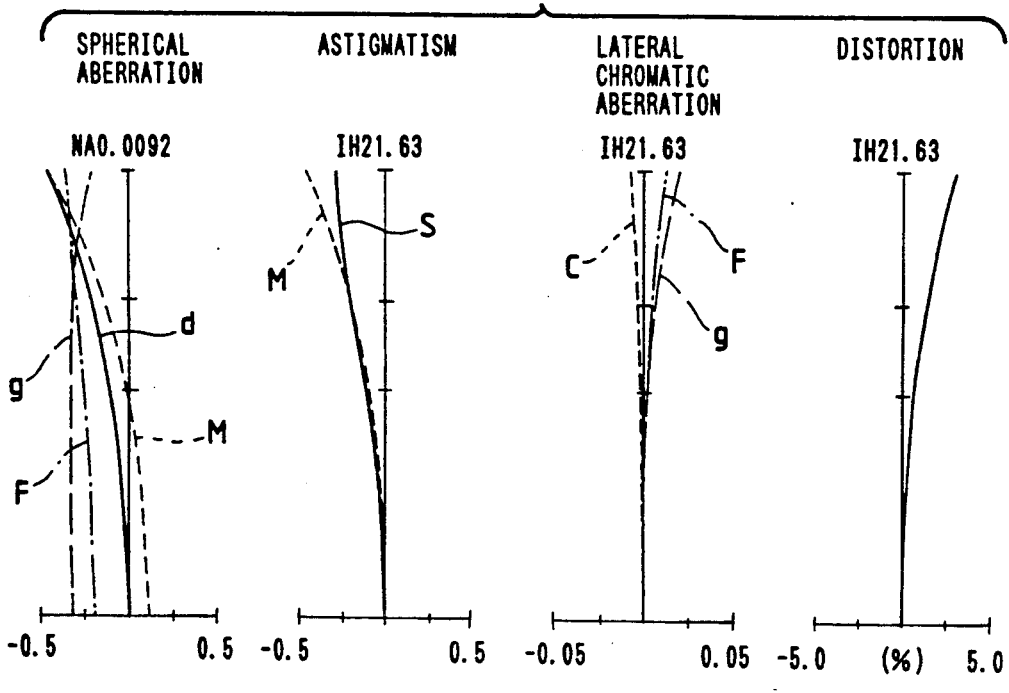

FIG. 20
FIG. 21
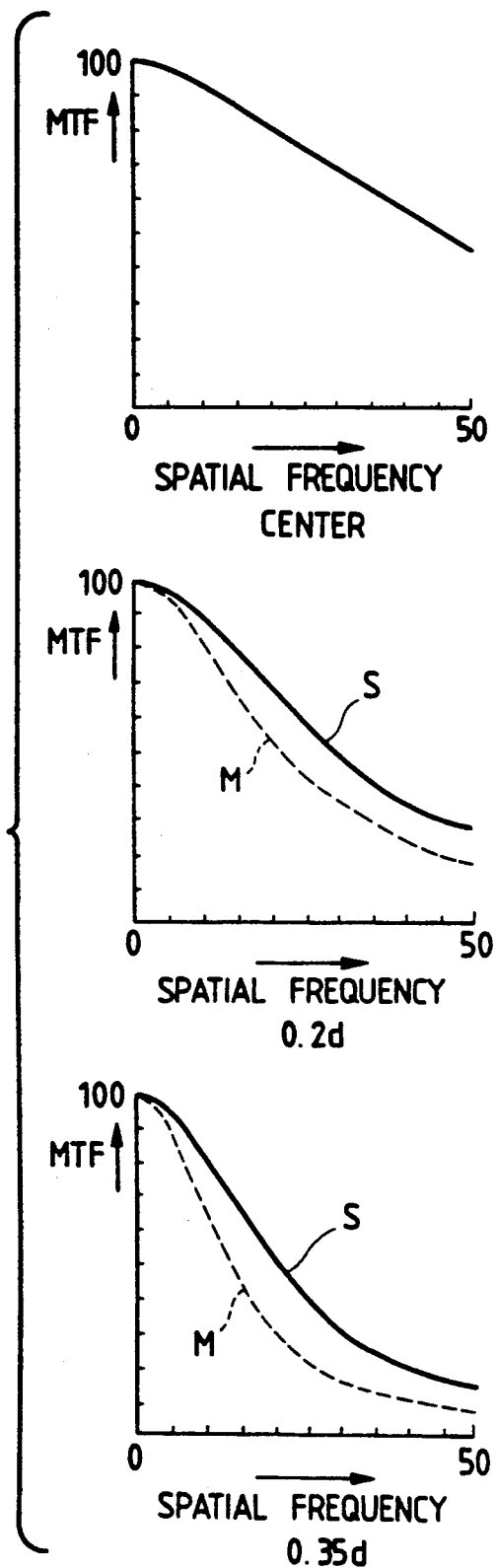
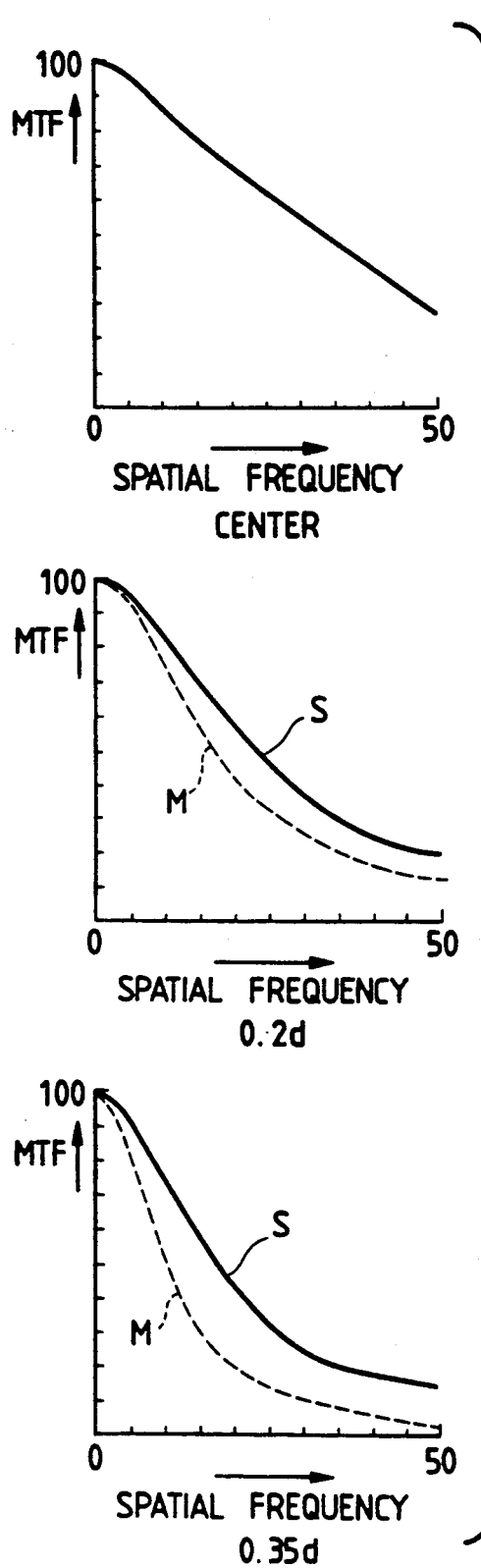

ZOOM LENS SYSTEM

BACKGROUND OF THE INVENTION a) Field of the invention

The present invention relates to a zoom lens system which permits photographing an object located at an exceptionally short distance.

b) Description of the prior art

The photographic instruments, typically represented by cameras, are equipped with zoom lens systems. Though it is general to place great importance on operability and portability of the zoom lens systems, the fundamental importance of the zoom lens systems lies in the optical performance thereof. The zoom lens systems are prevailing especially for the convenience or versatility in practical use thereof. In the recent trend, the zoom lens systems are designed for wider vari-focal ranges, i.e., higher vari-focal ratios. At such high vari-focal ratios, it is difficult for the zoom lens systems to permit photographing objects located at shorter distances regardless of focusing method and the conventional zoom lens systems are equipped with an additional function for photographing objects located at the shorter distances in addition to the general functions of the zoom lens systems.

A certain type of the ordinary zoom lens system is focused on an object located at a short distance outside the ordinary focusing range by expanding the moving range of ordinary focusing lens unit. Another type of the ordinary zoom lens system is focused on an object located at a short distance outside the ordinary focusing range by moving lens unit other than the ordinary focusing lens unit.

All of these conventional zoom lens systems allow remarkable variations of aberrations to be caused by focusing and have a common defect that optical performance thereof is degraded for photographing objects located at the shorter distances. Especially curvature of field and distortion make insufficient or dull the image flatness, reproduction and marginal light amount for photographing or copying planar objects.

Since most of the conventional zoom lens systems are designed mainly for photographing objects located at nearly infinite distance and used for photographing objects located at the shorter distances as modifications, these zoom lens systems allow aberrations to be varied remarkably by moving the lens components or lens units for photographing objects located at short distances. It is of course possible to obtain favorable image quality for objects located at the shorter distances by designing a lens system like the macro lens systems, mainly for photographing objects located at short distances. In cases of the lens systems for cameras which are to be used for multiple purposes, however, such a design cannot provide sufficiently favorable image quality for an object located at a long distance.

In order to obtain favorable image qualities for objects located at long distance as well as the objects located at short distances, it is proper to combine a zooming system allowing little variations of aberrations to be caused by focusing and a focusing system allowing little variations of aberrations. However, it is difficult, by applying this concept to a zoom lens system having a high vari-focal ratio, to design a zoom lens system which can provide sufficiently favorable image qualities over the entire zooming range and over the entire focusing range.

On the other hand there is known a method to perform focusing especially by moving a lens component or a lens unit for photographing an object located at the shorter distance, and a telephoto zoom lens system for single reflex cameras designed on the basis of this method has already been developed. However, this zoom lens system is strictly limited in the photographing range thereof, has insufficient optical performance and is scarecely used in practice in the present days.

SUMMARY OF THE INVENTION

A primary object of the present invention is to provide a zoom lens system which has a relatively high vari-focal ratio and can be focused on objects located within a range from infinite distance to an exceptionally short distance while maintaining a condition where aberrations are favorably corrected.

The zoom lens system according to the present invention comprises a plurality of lens units and is adapted so as to vary the focal length thereof by moving at least one of said plurality of lens units. The zoom lens system according to the present invention is further adapted so as to be focused on an object located at the exceptionally short distance by moving at least one of said plurality of lens units along a moving focus which is different from that for varying the focal length of the zoom lens system.

The zoom lens system according to the present invention is designed on a fundamental concept that the ordinary zoom lens system is to be used as two independent lens systems. Speaking concretely, when the lens system is to be used as the ordinary zoom lens system, the lens units are moved along moving loci for the ordinary zooming. At each of the zoomed states within the zooming range, focusing on objects located within the range from infinite to short distances is performed by the method which is carreid out ordinarily. For focusing the lens system on an object located at a distance shorter than the shortest distance within the zooming range (exceptionally short distance), at least one of the lens unit is offset from the zooming locus thereof and moved differently for focusing. By moving the lens units as described above, the zoom lens system according to the present invention can be focused adequately on objects located within the range from infinite distance to the exceptionally short distance. In the condition where the zoom lens system according to the present invention is focused on an object located at the exceptionally short distance, the lens units are arranged differently from the status thereof in the zoomed condition of the lens system and compose, as it were, an optical system which is different from the original optical system.

When focused on an object located at the above-mentioned exceptionally short distance, the zoom lens system can be zoomed in a case and cannot be zoomed in another case. The lens system which cannot be zoomed in the condition where it is focused on an object located at the exceptionally short distance can be used as a zoom lens system permitting focusing on objects located within the range from infinite distance to short distance, and also as a lens system having a single focal length and permitting focusing on objects located within the range from infinite distance to the exceptionally short distance.

The object of the present invention can be accomplished by designing a single lens system so as to be usable as a zoom optical system comprising the lens units arranged and movable as those in the ordinary zoom lens system, and modifiable into a optical system for photographing an object located at the exceptionally short distance (hereinafter referred to as the macro optical system) by arranging the lens unit differently.

The zoom lens system according to the present invention may be of a type comprising, in the order from the object side, a first lens unit having a positive refractive power, a second lens unit having a positive refractive power and a third lens unit having a negative refractive power, each of which is to be moved along the optical axis for varying the focal length of the zoom lens system as a whole. This type of zoom lens system will be described more detailedly below.

A conceptional diagram illustrating the power distribution in this type of zoom lens system is shown in FIG. 1, wherein the reference symbol W represents the wide position and the reference symbol T designates the tele position. The lens units are to be moved along the loci indicated by the solid lines.

In the above-mentioned macro optical system, the lens units should be located at positions to which the lens units can be moved mechanically from the locations in the zoom lens system. The macro optical system, which has a composition independent from that within the vari-focal range of the zoom lens system, has an image point deviated from that of the zoom optical system as shown in FIG. 2 (only the image point at the tele position is shown).

A zoom lens system is generally designed in such a manner that an image point is kept fixed during zooming from the wide position to the tele position thereof with the zoom lens system focused on an object located at infinite distance. In this zooming range, the lens units of the lens system are moved so as to maintain positional relationship satisfying a functional relation expressed by a polynominal. Accordingly, an optical system comprising the lens units located in positional relationship which does not satisfy the functional relation forms an image at a location different from that of the image formed by the zoom lens system. As a result, the macro optical system according to the present invention forms an image at a location which is different from that of the image formed by the optical system used as the zoom lens system according to the present invention. FIG. 2 exemplifies a case wherein the macro optical system has an image point located on the object side of the image point of the optical system established as the zoom lens system.

The lens system according to the present invention is adapted so as to correct the deviation of the image point or focus the macro optical system by moving a focusing lens unit (a negative lens unit in the illustrated case) as shown in FIG. 3.

In the present invention, a main design point is placed on the optical performance of the macro optical system. For this reason, the zoom lens system according to the present invention is composed of the positive, positive and negative lens units so as to have excellent optical performance. This lens system has the composition similar to that of the zoom lens system disclosed by Japanese Patent Kokai Publication No. Sho 63-153511 and is of a type which is suited for modification into the above-described macro optical system.

That is to say, the zoom lens system according to the present invention has the composition shown in FIG. 4 illustrating an embodiment of the present invention to be described later. This lens system is adapted so as to allow the lens units to be moved as indicated by the solid lines within the ordinary zooming range, and also as indicated by the dashed lines for establishing the macro optical system.

For the zoom lens system according to the present invention, it is desirable to select a lens type which has very excellent optical performance, and can be modified into a macro optical system which permits photographing objects located within a range from infinite distance to an exceptionally short distance and can be focused with little variations of aberrations by moving a single focusing lens unit. In the lens system shown in FIG. 4, the second lens unit is selected as the focusing lens unit.

Taking into consideration the variations of magnifications and aberrations to be caused by moving the focusing lens unit in the above-mentioned lens system composed of the three lens units, it is desirable to satisfy the following conditions (i) and (ii) for obtaining an optical system having stable optical performance and influenced little by manufacturing errors.

$$\gamma_2 = \gamma_3 - \gamma_{23} \quad \text{(i)}$$

$$\gamma_{2M} < \gamma_{2T} \quad \text{(ii)}$$

wherein the reference symbol $\gamma_2$ represents the longitudinal magnification in the vicinity of the image surface for the moving distance of the second lens unit, the reference symbol $\gamma_3$ designates the longitudinal magnification in the vicinity of the image surface for the moving distance of the third lens unit, the reference symbol $\gamma_{23}$ denotes the longitudinal magnification in the vicinity of the image surface for the moving distance of the second and third lens units in a case where these lens units are moved integrally or the moving distance of the first lens unit, the reference symbol $\gamma_{2M}$ represents the value of $\gamma_2$ at the position for photographing an object located at the exceptionally short distance, and the reference symbol $r_{2T}$ designates the value of $\gamma_2$ at the tele position.

The influence on the displacement of the image surface to be caused by moving the second lens unit can be known from the formula (i). Further, the formula (ii) indicates that $\gamma_2$ at the condition for photographing an object located at the exceptionally short distance is to be smaller than that at the tele position. This means that the moving distance for focusing at the position for photographing an object located at the exceptionally short distance is shorter than that for focusing on a short distance at the tele position. That is to say, the second lens unit is located so as to satisfy the following relationship (iii) between the tele position and the position for photographing an object located at the exceptionally short distance:

$$D_{2M} > D_{2T} \quad \text{(iii)}$$

wherein the reference symbol $D_{2M}$ represents the airspace as measured on the optical axis between the second lens unit and the third lens unit at the position for photographing an object located at the exceptionally short distance, and the reference symbol $D_{2T}$ designates the airspace as measured on the optical axis between the second lens unit and the third lens unit at the tele position.

On the basis of the foregoing description, the formula (iii) must be satisfied in order that the lateral magnification of the third lens unit at the position for photographing an object located at the exceptionally short distance is lower than the lateral magnification thereof at the tele position. In order to satisfy the formula (iii), it is necessary that the macro optical system has a focal length which is not longer than that of the optical system at the tele position where it is used as the zoom lens system. In other words, the lens system according to the present invention must satisfy the following formula (iv):

$$f_1 \cdot \beta_{2M} \cdot \beta_{3M} < f_1 \cdot \beta_{2T} \cdot \beta_{3T} \quad \text{(iv)}$$

wherein the reference symbol $f_1$ represents the focal length of the first lens unit, the reference symbols $\beta_{2T}$ and $\beta_{3T}$ designate the lateral magnifications of the second lens unit and the third lens unit respectively at the tele position, and the reference symbols $\beta_{2M}$ and $\beta_{3M}$ denote the lateral magnifications of the second lens unit and the third lens unit respectively at the position for photographing an object located at the exceptionally short distance.

As is understood from the foregoing description, it is possible to impart a vari-focal function to the lens system according to the present invention by determining, at the stage to arrange the lens units, the airspace to be reserved between the second lens unit and the third lens unit so as to satisfy the formula (iii) and varying the airspace so as to satisfy the formula (iii).

A general zoom lens system can be focused on objects located within the range from infinite distance to the exceptionally short distance with a specific focal length selected within the ordinary zooming range from the wide position to the tele position thereof. In the vicinity of the exceptionally short distance, however, the zoom lens system allows aberrations to be varied and forms images affected by aberrations.

In contrast, the zoom lens system according to the present invention can be focused on an object located at the exceptionally short distance so as to form an image of high quality since it can establish the macro optical system suited for photographing an object located at the exceptionally short distance independently of the optical system to be used within the ordinary zooming range. Further, the zoom lens system according to the present invention may be designed so as to establish the macro optical system which can be focused on objects located within the range from infinite distance to the extremely short distance.

If the above-mentioned condition (iii) is not satisfied, the macro optical system must be focused while it has a long focal length, thereby allowing spherical aberration and other aberrations to be varied remarkably by focusing. In addition, the zoom lens system will have a high photographing magnification even when the lens system is focused on an object located at a long distance, but each of the lens units will have a high longitudinal magnification, whereby the lens system will be largely influenced by manufcturing and assembling errors of the lens elements thereof.

BRIEF DESCRIPTION OF THE DRAWINGS

FIG. 18 shows curves illustrating aberration characteristics of the Embodiment 4 of the present invention for an object located at a distance of 1.2 m;

FIG. 19 shows curves illustrating aberration characteristics of the Embodiment 4 of the present invention for an object located at a distance of 0.6 m;

FIG. 20 and FIG. 21 show curves illustrating MTF's of the Embodiment 3 of the present invention for an object located at distance of 1.2 m and 0.6 m respectively;

DETAILED DESCRIPTION OF THE PREFERRED EMBODIMENTS

Now, the present invention will be described more detailedly with reference to the accompanying drawings.

Figure 1:
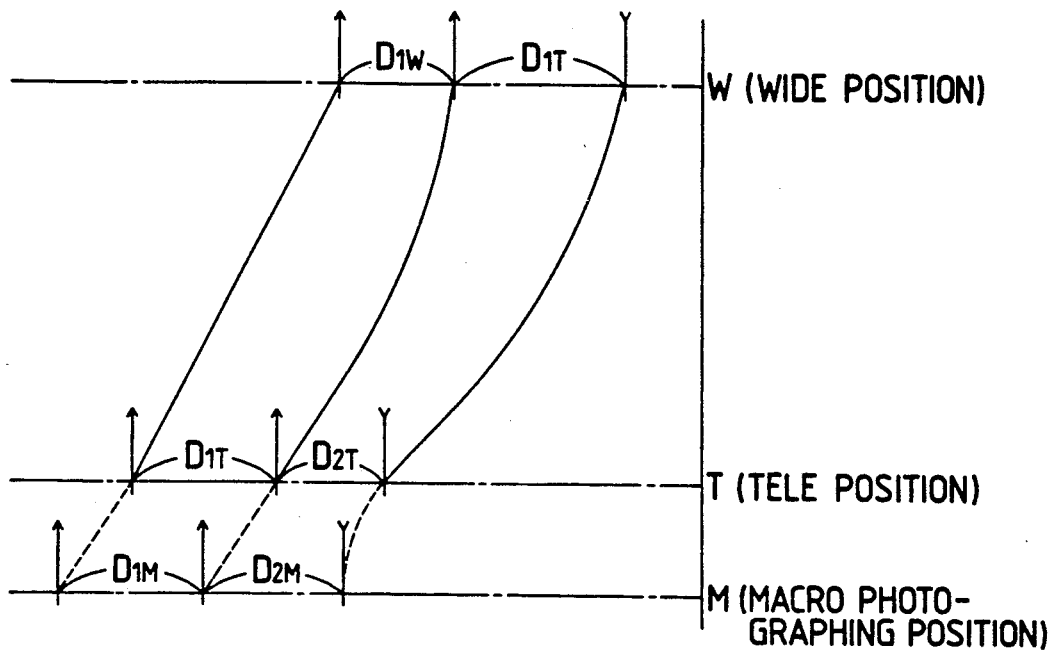
FIG. 1 shows a diagram illustrating the fundamental composition of the zoom lens system according to the present invention.
Figure 2:
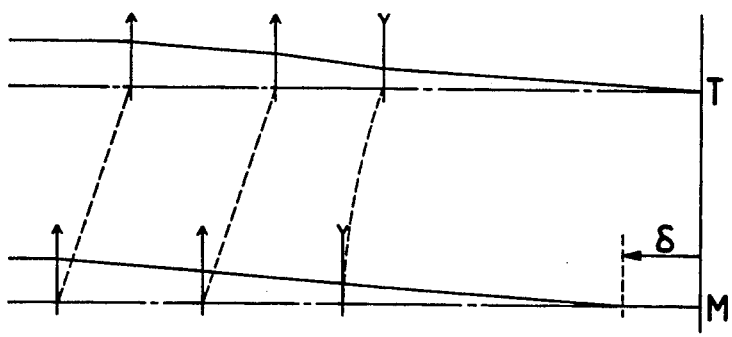
FIG. 2 and FIG. 3 show diagrams illustrating composition of the zoom lens system according to the present invention in the condition where the lens system is set at the position for photographing an object located at the exceptionally short distance.
Figure 3:
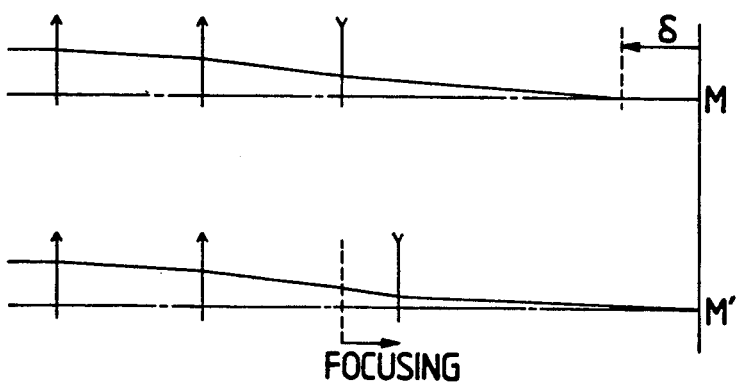
Figure 4:
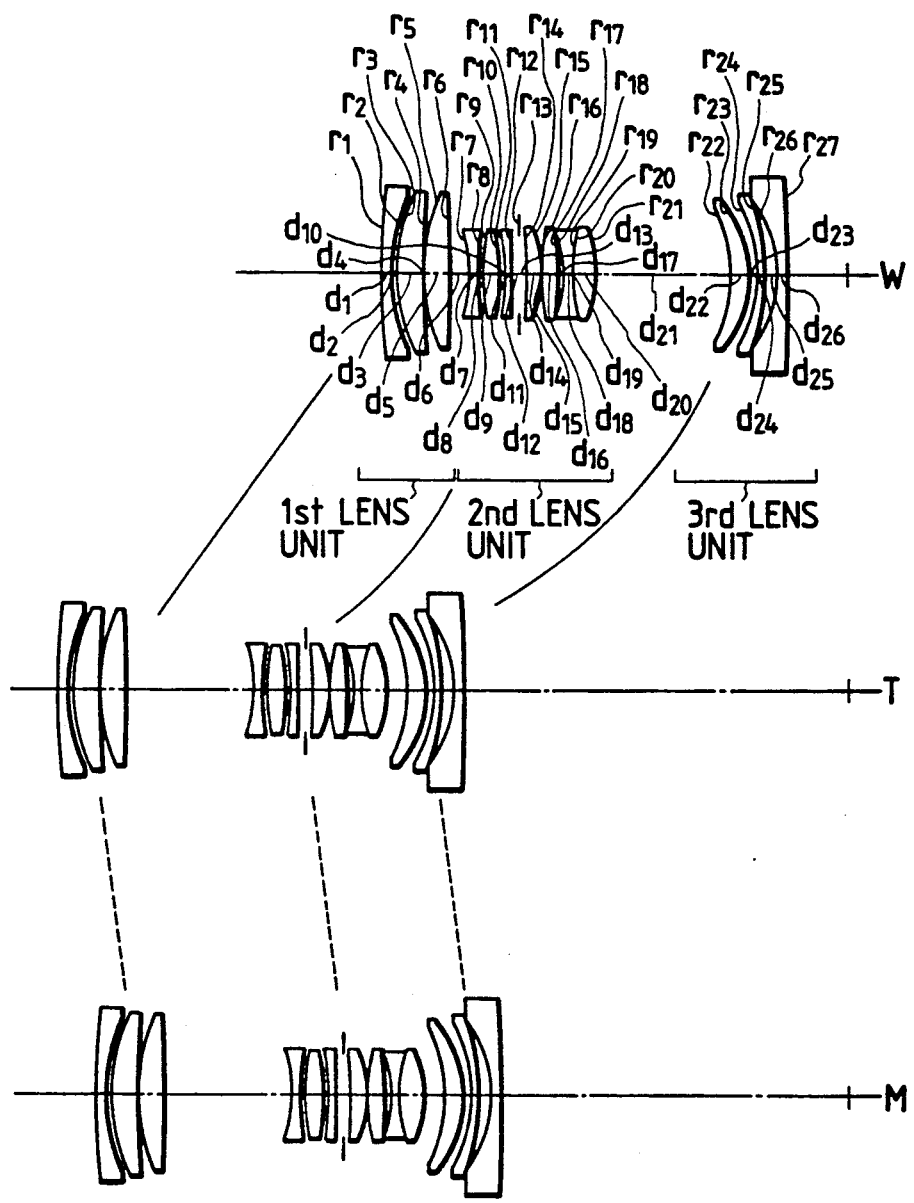
FIG. 4 shows a sectional view illustrating composition of Embodiment 1 of the zoom lens system according to the present invention.

The Embodiment 1 of the present invention has the composition illustrated in FIG. 4 and is designed with the following numerical data:

Embodiment 1
$f = 39.5 \sim 102.7$, $F/4.65 \sim 6.55$
$2\omega = 57.4° \sim 23.8°$

| | | |
|---|---|---|
| $r_1 = 115.2670$ | | |
| | $d_1 = 1.4000$ | $n_1 = 1.83400$ $v_1 = 37.16$ |
| $r_2 = 28.8331$ | | |
| | $d_2 = 0.7100$ | |
| $r_3 = 28.2651$ | | |
| | $d_3 = 3.4000$ | $n_2 = 1.60300$ $v_2 = 65.48$ |
| $r_4 = 102.8707$ | | |
| | $d_4 = 0.2000$ | |
| $r_5 = 29.0721$ | | |
| | $d_5 = 3.8000$ | $n_3 = 1.55671$ $v_3 = 58.68$ |
| $r_6 = -339.3697$ | | |
| | $d_6 = D_1$ (variable) | |
| $r_7 = -19.5695$ | | |
| | $d_7 = 1.4000$ | $n_4 = 1.79500$ $v_4 = 45.29$ |
| $r_8 = 33.4856$ | | |
| | $d_8 = 0.5500$ | |
| $r_9 = 32.5005$ | | |
| | $d_9 = 2.5000$ | $n_5 = 1.78472$ $v_5 = 25.68$ |
| $r_{10} = -70.3092$ | | |
| | $d_{10} = 0.5000$ | |
| $r_{11} = -97.0891$ | | |
| | $d_{11} = 1.4000$ | $n_6 = 1.69100$ $v_6 = 54.84$ |
| $r_{12} = -1305.1334$ | | |
| | $d_{12} = 1.0000$ | |
| $r_{13} = \infty$ (stop) | | |
| | $d_{13} = 1.0000$ | |
| $r_{14} = -133.7972$ | | |
| | $d_{14} = 2.2500$ | $n_7 = 1.63636$ $v_7 = 35.37$ |
| $r_{15} = -18.7647$ | | |
| | $d_{15} = 0.2000$ | |
| $r_{16} = 38.5688$ | | |
| | $d_{16} = 2.5000$ | $n_8 = 1.62230$ $v_8 = 53.20$ |
| $r_{17} = -44.5886$ | | |
| | $d_{17} = 0.8500$ | |
| $r_{18} = -16.5161$ | | |
| | $d_{18} = 1.2500$ | $n_9 = 1.74000$ $v_9 = 28.29$ |
| $r_{19} = 33.1126$ | | |
| | $d_{19} = 0.2400$ | |
| $r_{20} = 39.7549$ | | |
| | $d_{20} = 3.2500$ | $n_{10} = 1.62299$ $v_{10} = 58.14$ |
| $r_{21} = -16.5460$ | | |
| | $d_{21} = D_2$ (variable) | |
| $r_{22} = -23.9539$ | | |
| | $d_{22} = 2.9500$ | $n_{11} = 1.78470$ $v_{11} = 26.30$ |
| $r_{23} = -17.3716$ | | |
| | $d_{23} = 0.8600$ | |
| $r_{24} = -24.3055$ | | |
| | $d_{24} = 1.3000$ | $n_{12} = 1.72916$ $v_{12} = 54.68$ |
| $r_{25} = -33.1830$ | | |
| | $d_{25} = 2.1000$ | |

-continued

Embodiment 1
$f = 39.5 \sim 102.7$, $F/4.65 \sim 6.55$
$2\omega = 57.4° \sim 23.8°$

| | | |
|---|---|---|
| $r_{26} = -18.2661$ | | |
| | $d_{26} = 1.3000$ | $n_{13} = 1.72916$ $v_{13} = 54.68$ |
| $r_{27} = -304.9233$ | | |

| | W | T | Macro photographing |
|---|---|---|---|
| $D_1$ | 2.550 | 17.590 | 17.590 |
| $D_2$ | 18.850 | 2.820 | 3.600 |
| $\gamma_{2M} = 6.6$ | $\gamma_{2T} = 7.62$ | | | wherein the reference symbol $r_1$, $r_2$, ... represent radii of curvature of the respective lens elements, the reference symbols $d_1$, $d_2$, ... designate thicknesses of the respective lens elements and the airspaces reserved therebetween, the reference symbols $n_1$, $n_2$, ... denote refractive indices of the respective lens elements, and the reference symbols $v_1$, $v_2$, ... represent Abbe's numbers of the respective lens elements.

The Embodiment 1 is zoomed from the wide position to the tele position by varying the airspace $d_6 = D_1$ and the $d_{21} = D_2$ from W (wide position) to T (tele position) in the above-mentioned numerical data, i.e., by moving the lens units as indicated by the solid lines in FIG. 4. At each focal length within this zooming range, the zoom lens system is focused on objects located within a range from infinite distance to a short distance by moving the second lens unit along the optical axis. For photographing an object located at the exceptionally short distance, the airspaces are varied to the values of $D_1$ and $D_2$ for photographing an object located at the exceptionally short distance listed in the above numerical data. That is to say, the macro optical system is established by moving the lens units along the loci indicated by the dashed lines which are quite different from the loci for zooming indicated by the solid lines. This optical system can be focused on an object located at the exceptionally short distance.

As is understood from the foregoing description, the Embodiment 1 can be focused on objects located within a continuous range from infinite distance to the exceptionally short distance when it has a specific focal length. That is to say, the Embodiment 1 is usable as a lens system which has a single focal length and can be focused on objects located from infinite distance to the exceptionally short distance.

The Embodiment 2 of the present invention is designed with the numerical data which are the same as those of the Embodiment 1, but has a lens arrangement different from that of the Embodiment 1 when established as the macro optical system. Speaking concretely, the airspaces are set at the values listed below when the Embodiment 2 is established as the macro optical system.

| | |
|---|---|
| $D_1$ | 17.590 |
| $D_2$ | 4.200 |
| $\gamma_{2M} = 5.942$ | $\gamma_{2T} = 7.62$ |

When established as the macro optical system, the Embodiment 2 has a focal length different from that of the Embodiment 1.

Figure 5:
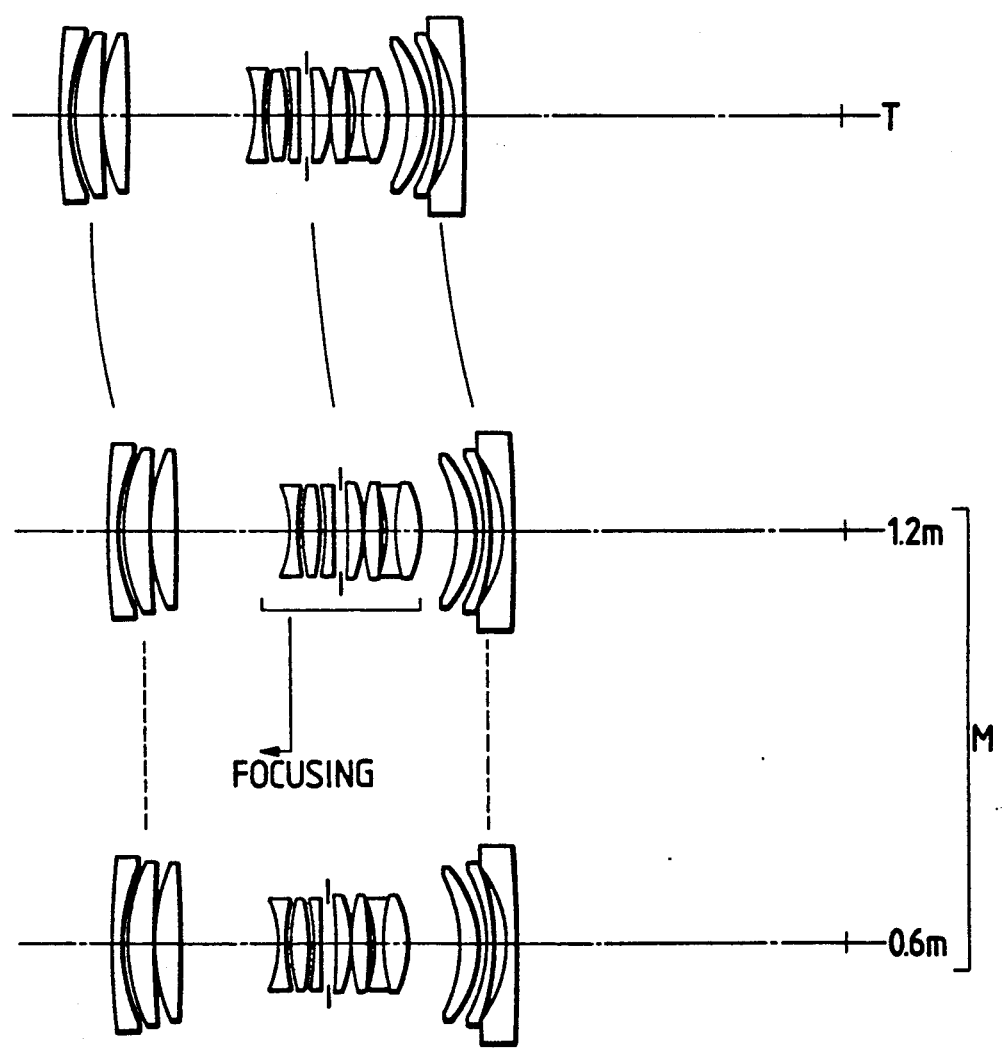
FIG. 5 and FIG. 6 show sectional views illustrating compositions of Embodiments 3 and 4 respectively of the zoom lens system according to the present invention.

The Embodiment 3 of the present invention has the composition illustrated in FIG. 5, and is zoomed from the wide position to the tele position and focused on objects located within the zooming range from infinite to the short distance in the same manner as the Embodiment 1 and 2.

However, the Embodiment 3 can be focused independently on objects located within a photographing distance range from 1.2 m to 0.6 m. Speaking more concretely, the Embodiment 3 is focused on an object located at the distance of 1.2 m by moving all the lens units so as to vary the airspace reserved between the first lens unit and the second lens unit as well as the airspace reserved between the second lens unit and the third lens unit. Taking this focused condition on the object located at the distance of 1.2 m as a zero point or a standard point, the Embodiment 3 can be focused on objects located within a continuous range to 0.6 m.

When the Embodiment 3 is focused on the objects located at the distances of 1.2 m and 0.6 m, the airspaces are set as follows:

|  | 1.2 m | 0.6 m |
| --- | --- | --- |
| $D_1$ | 15.966 | 14.207 |
| $D_2$ | 5.444 | 7.203 |
| $\gamma_{2M} = 5.228$ | $\gamma_{2T} = 7.62$ |  |

From the viewpoints of optical performance of the macro optical system and lens movement for focusing in the composition of the Embodiment 3, it is necessary to design the zoom lens system upon examinations of the type of the driving mechanism to be adopted or accuracies of image surface shift per pulse to be applied to the driving motor and other control functions.

Figure 14:
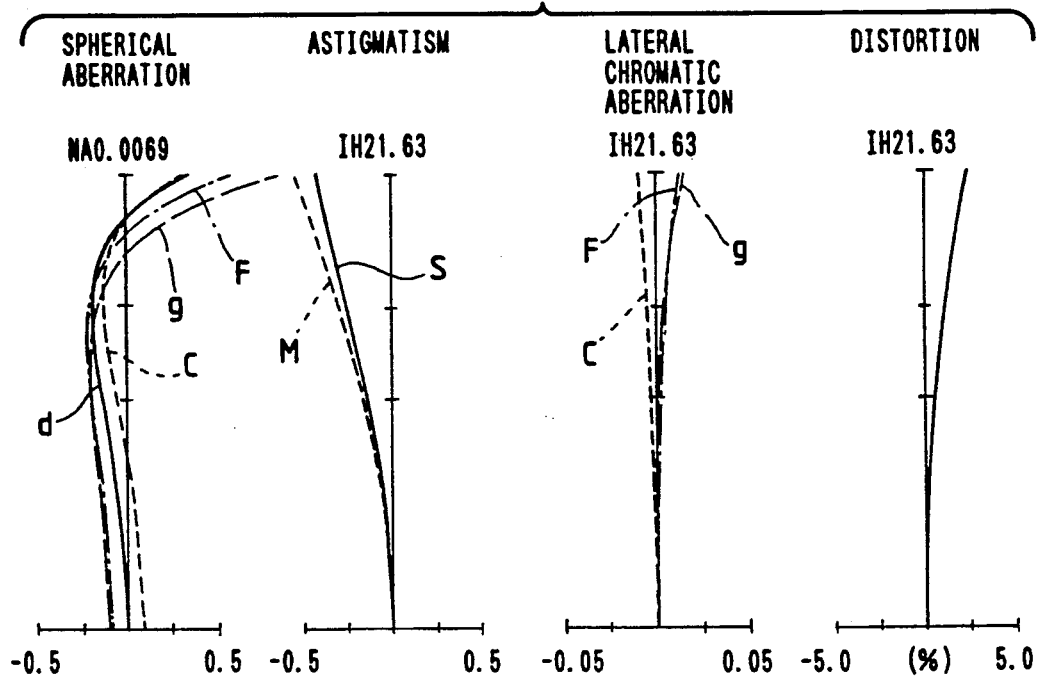
FIG. 14 shows graphs illustrating aberration characteristics of the Embodiment 3 of the present invention for an object located at a distance of 1.2 m.
Figure 15:
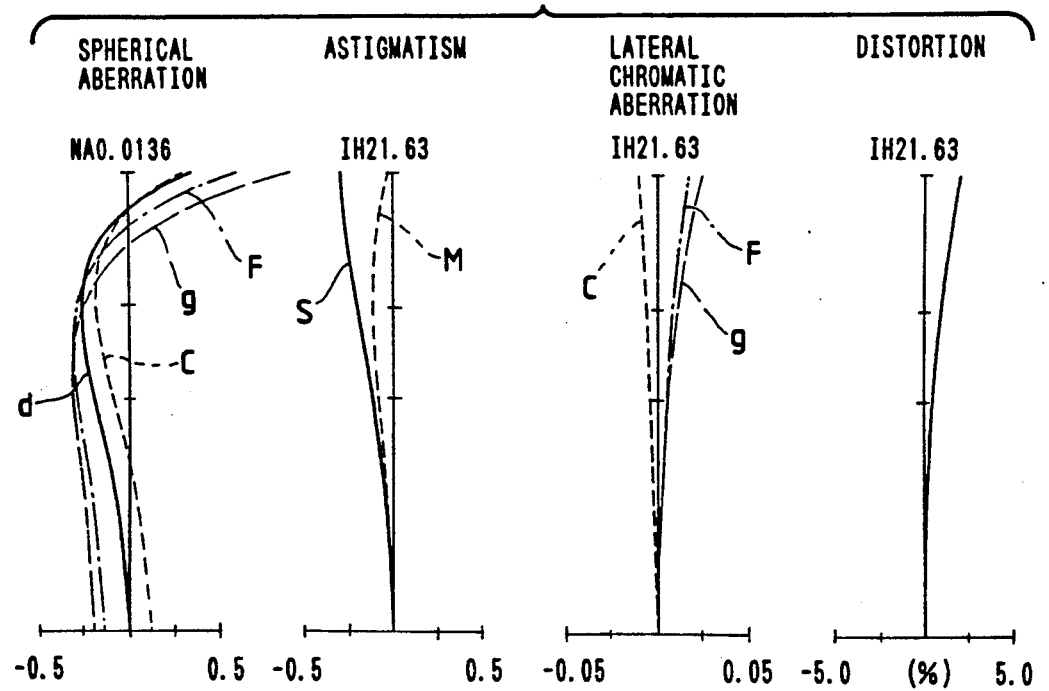
FIG. 15 shows graphs illustrating aberration characteristics of the Embodiment 3 of the present invention for an object located at a distance of 0.6 m.
Figure 16:
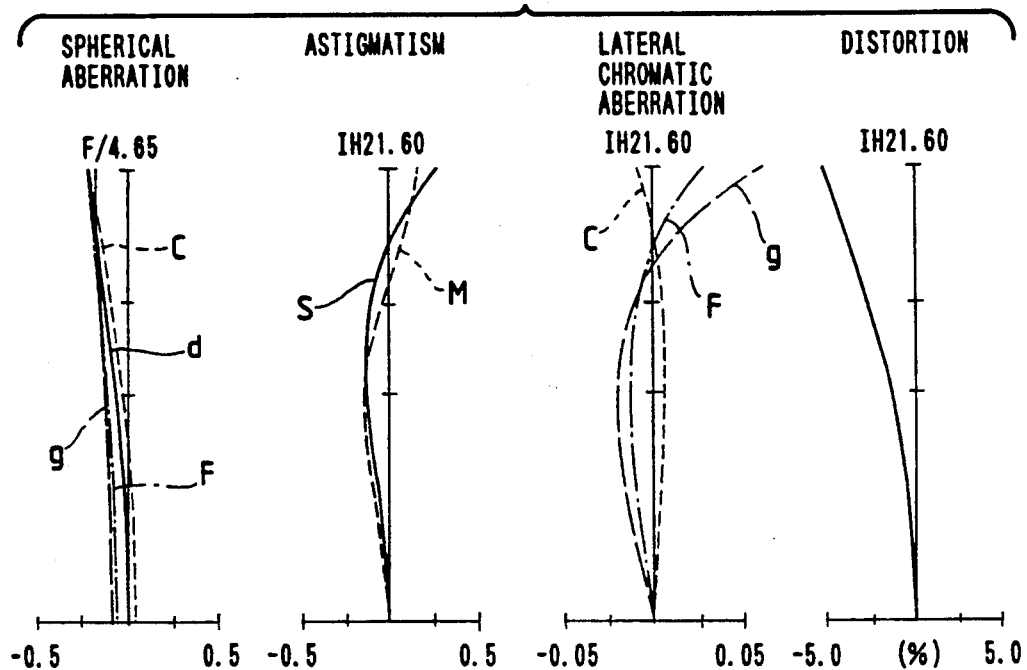
FIG. 16 shows curves illustrating aberration characteristics at the wide position of the Embodiment 4 of the present invention for an object located at infinite distance.
Figure 17:
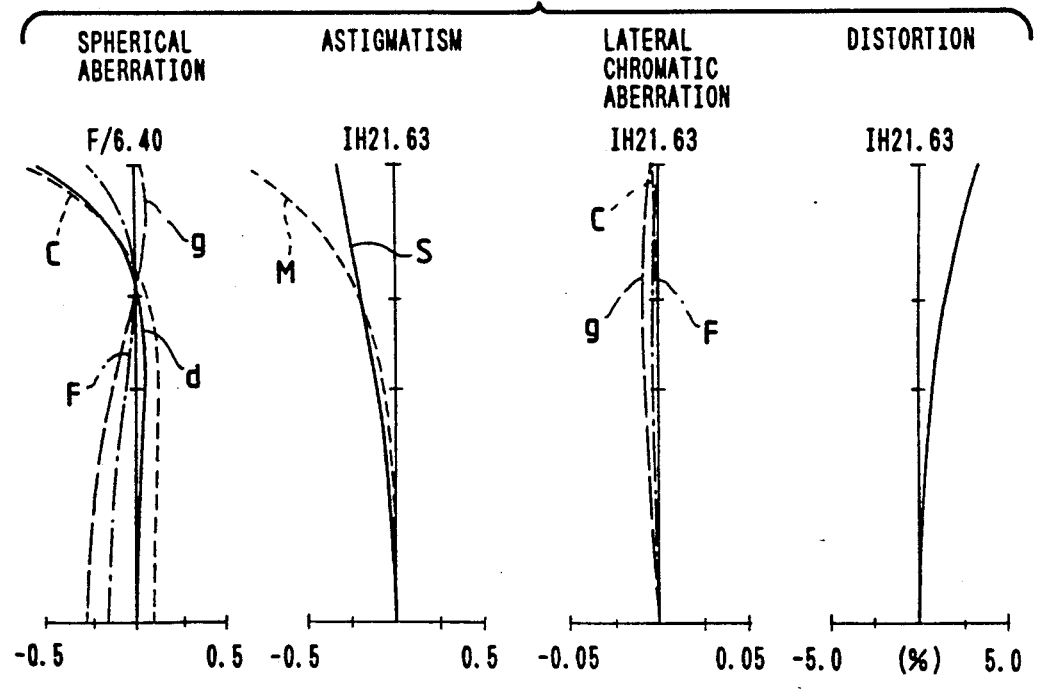
FIG. 17 shows curves illustrating aberration characteristics at the tele position of the Embodiment 4 of the present invention for an object located at infinite distance.
Figure 22:
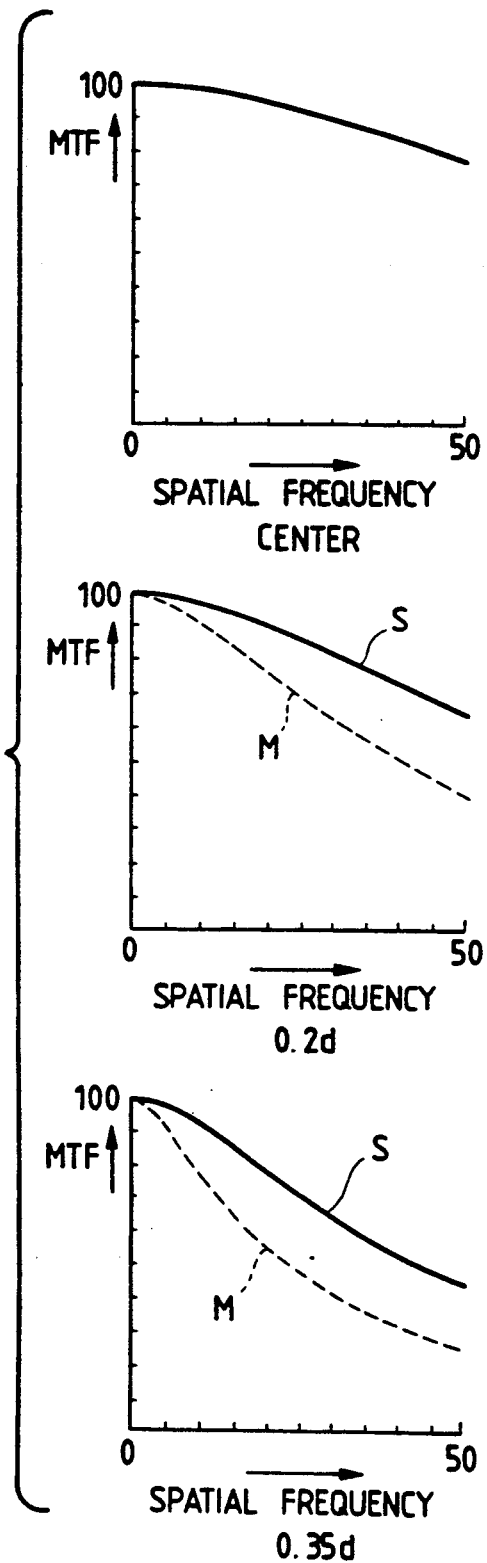
FIG. 22 and FIG. 23 show curves illustrating MTF's of the Embodiment 4 of the present invention for objects located at distance of 1.2 m and 0.6 m respectively.
Figure 23:
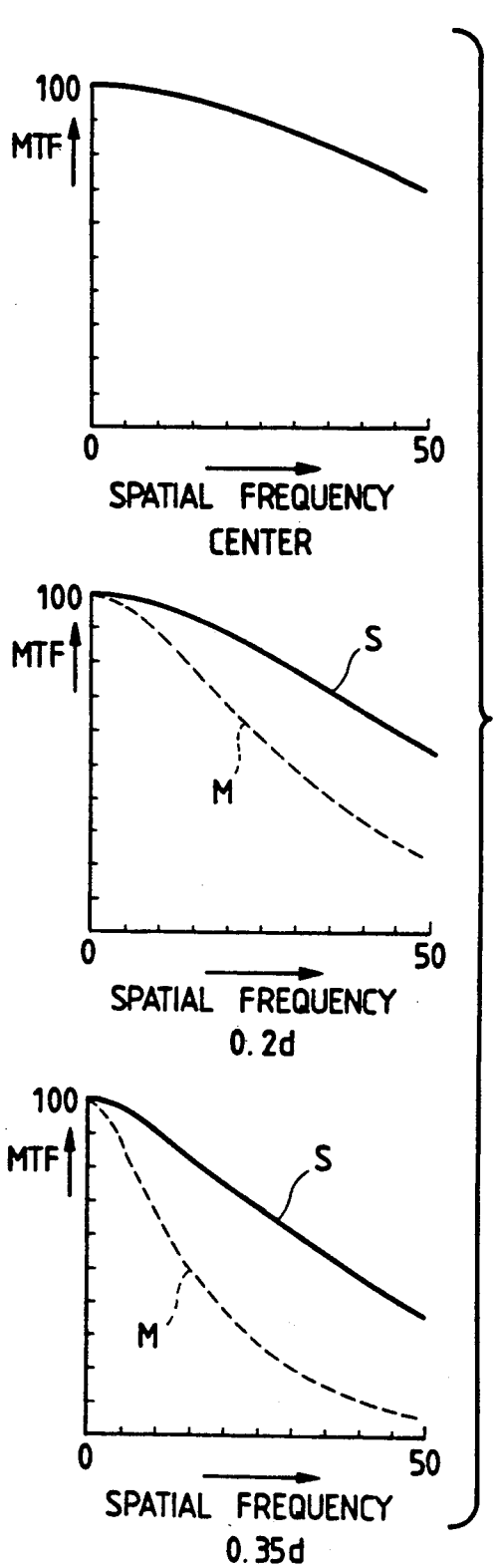

In the Embodiment 3, the second lens unit is moved for a distance of 1.76 mm for focusing the optical system on an object located at the distance of 0.6 m from the object located at the distance of 1.2 m. Further, the Embodiment 3 has stable optical performance as is clear from the aberration characteristic curves illustrated in FIG. 14 and FIG. 15, and features sufficiently high focusing accuracy since it can provide high image contrast owing to the MTF's which are stable at the low frequencies as shown in FIG. 20 and FIG. 21.

The Embodiment 3, when established as the macro optical system, has the composition designed taking the specific photographing distance as standard, and therefore has favorable optical performance to assure little variations of aberrations within a range for photographing objects located at finite distances.

The zoom lens system according to the present invention can be focused on objects located within the range from infinite distance to the short distance by moving the specific lens unit, for example the second lens unit in the Embodiment 3, within the ordinary zooming range from the wide position to the tele position and, when established as the macro optical system, the lens system can be focused on objects located at distances shorter than the shortest distance within the ordinary zooming range so as to provide favorable optical performance.

The moving distance of a lens unit for focusing is prolonged as the focal length and the inverse number of photographing distance of an optical system become larger. In such a case, the lens unit must be moved for a long distance in the optical system for photographing an object located at the exceptionally short distance, thereby a slowing down focusing speed. Further, when an autofocus system is adopted in combination with the lens unit to be moved for a long distance for focusing, there will be posed a problem that defocusing per step of a driving motor is increased.

Since the Embodiment 3 is composed so as to establish the independent macro optical system which is designed taking the finite distance as standard, the lens unit is moved for the short distance and the macro optical system is free from the problem described above.

Figure 6:
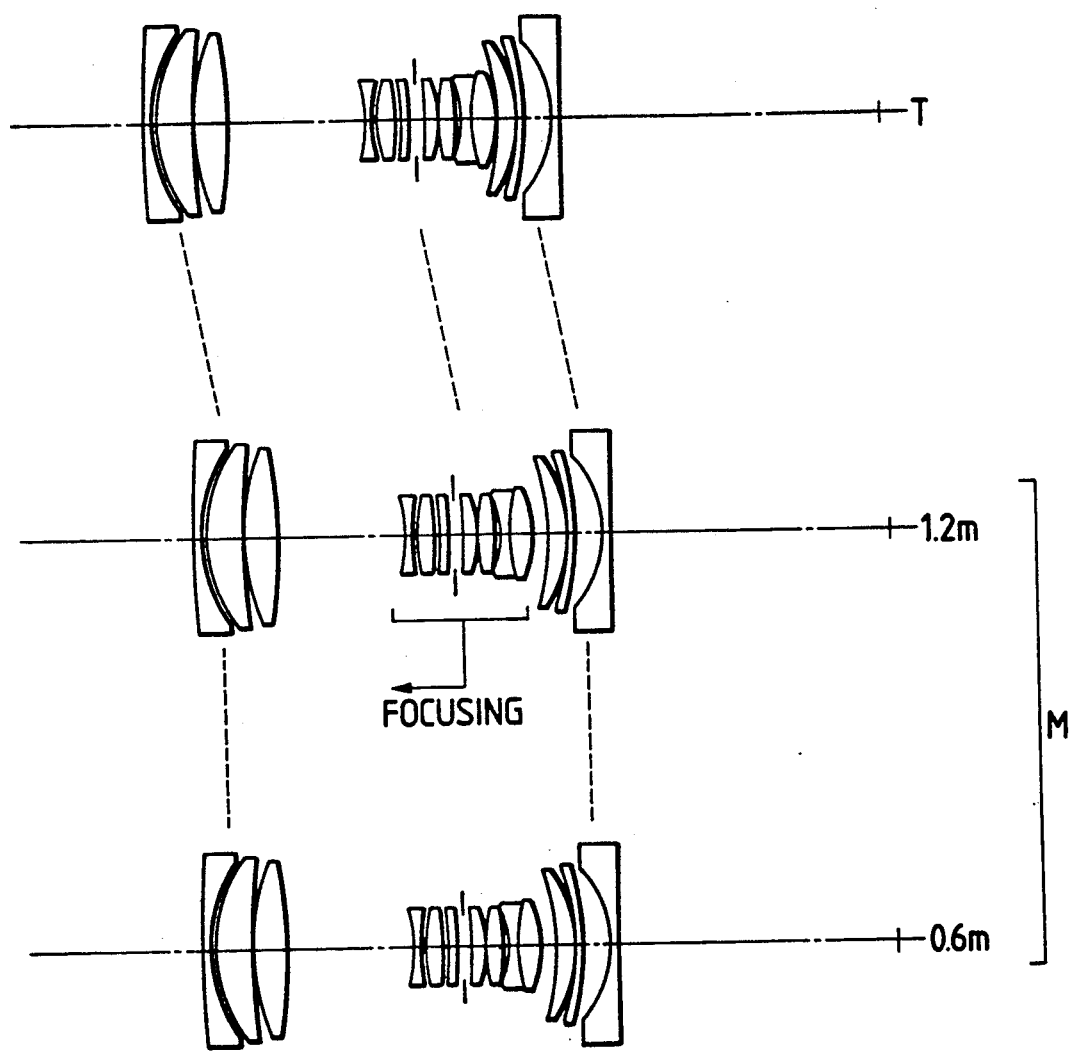

The Embodiment 4 is a lens system which has the composition shown in FIG. 6, a wide angle and a high vari-focal ratio. The Embodiment 4 is usable as a zoom optical system to be zoomed ordinarily from the wide position to the tele position and also as an independent macro optical system. When established as macro the optical system, the Embodiment 4 permits, like the Embodiment 3, photographing objects located within a range from 1.2 m to 0.6 m.

The Embodiment 4 has the numerical data listed below:

Embodiment 4
$f = 30.28 \sim 77.75$, $F/4.65 \sim 6.4$
$2\omega = 71.1° \sim 31.1°$ $r_1 = 213.8660$
$\quad d_1 = 1.4000 \quad n_1 = 1.83400 \quad v_1 = 37.16$
$r_2 = 23.8020$
$\quad d_2 = 0.6440$
$r_3 = 24.3680$
$\quad d_3 = 4.9250 \quad n_2 = 1.60300 \quad v_2 = 65.48$
$r_4 = 138.7480$
$\quad d_4 = 0.2020$
$r_5 = 33.2500$
$\quad d_5 = 4.8000 \quad n_3 = 1.56013 \quad v_3 = 46.99$
$r_6 = -97.1720$
$\quad d_6 = D_1$
$\quad$ (variable)
$r_7 = -18.4410$
$\quad d_7 = 1.4000 \quad n_4 = 1.79500 \quad v_4 = 45.29$
$r_8 = 29.9330$
$\quad d_8 = 0.5500$
$r_9 = 27.8420$
$\quad d_9 = 2.5000 \quad n_5 = 1.80518 \quad v_5 = 25.43$
$r_{10} = -74.0800$
$\quad d_{10} = 0.4970$
$r_{11} = -71.0280$
$\quad d_{11} = 1.4000 \quad n_6 = 1.69680 \quad v_6 = 56.49$
$r_{12} = -75.0820$
$\quad d_{12} = 1.0000$
$r_{13} = \infty$ (stop)
$\quad d_{13} = 1.0000$
$r_{14} = -89.7660$
(aspherical surface)
$\quad d_{14} = 2.2500 \quad n_7 = 1.59270 \quad v_7 = 35.29$
$r_{15} = -18.5670$
$\quad d_{15} = 0.2000$
$r_{16} = 48.1400$
$\quad d_{16} = 2.5000 \quad n_8 = 1.71285 \quad v_8 = 43.19$
$r_{17} = -28.8620$
$\quad d_{17} = 0.8830$
$r_{18} = -12.9000$
$\quad d_{18} = 1.2500 \quad n_9 = 1.74077 \quad v_9 = 27.79$
$r_{19} = 30.6950$
$\quad d_{19} = 0.3540$
$r_{20} = 34.4110$
$\quad d_{20} = 3.2500 \quad n_{10} = 1.60300 \quad v_{10} = 65.48$
$r_{21} = -13.2500$
$\quad d_{21} = D_2$
$\quad$ (variable)
$r_{22} = -31.7310$
$\quad d_{22} = 2.3500 \quad n_{11} = 1.80518 \quad v_{11} = 25.43$
$r_{23} = -20.0930$
$\quad d_{23} = 0.1500$
$r_{24} = -35.3150$
$\quad d_{24} = 1.1400 \quad n_{12} = 1.73500 \quad v_{12} = 49.82$
$r_{25} = -40.9110$
$\quad d_{25} = 4.0600$
$r_{26} = -15.1790$
(aspherical surface)
$\quad d_{26} = 1.1000 \quad n_{13} = 1.72916 \quad v_{13} = 54.68$ -continued Embodiment 4
f = 30.28~77.75, F/4.65~6.4
2ω = 71.1°~31.1°

$r_{27} = 641.4940$
Aspherical Coefficient
(14th surface)
$E = -0.41714 \times 10^{-5}$, $F = 0.42167 \times 10^{-7}$
$G = 0.92130 \times 10^{-9}$, $H = 0.17517 \times 10^{-10}$
(26th surface)
$E = 0.83684 \times 10^{-5}$, $F = 0.74530 \times 10^{-7}$
$G = -0.41430 \times 10^{-9}$, $H = 0.32416 \times 10^{-11}$

|  | W | T | 1.2 m | 0.6 m |
|---|---|---|---|---|
| $D_1$ | 1.830 | 18.850 | 17.987 | 16.975 |
| $D_2$ | 14.060 | 0.250 | 2.113 | 3.125 |

$\gamma_{2M} = 4.336$  $\gamma_{2T} = 5.80$

The Embodiment 4 has a wide angle and usable as a quasi-telephoto system at the tele position thereof. The Embodiment 4 is designed compact by using an aspherical surface and can establish a high performance macro optical system.

When the direction of the optical axis is taken as the x axis and the direction perpendicular to the optical axis is taken as the y axis, the shape of the aspherical surface used in the Embodiment 4 is expressed by the following formula:

$$x = (y^2/r)/\{1 + \sqrt{1 - (y/r)^2}\} + Ey^4 + Fy^6 + Gy^8 + Hy^{10} \ldots$$

wherein the reference symbol r represents the radius of curvature on the reference sphere of the aspherical surface, and the reference symbols E, F, G, H ..., designate the aspherical surface coefficients.

The image surface may be deviated by modifying the zoom lens system according to the present invention from the optical system for photographing within the ordinary zooming range to the macro optical system. This deviation of the image surface is corrected by moving the focusing lens unit in the lens system according to the present invention. In the Embodiments 3 and 4, the deviation of the image surface is corrected by moving the second lens unit selected as the focusing lens unit.

Now, description will be made on a mechanism which functions to hold the lens units in a lens barrel and move the lens units along the loci for zooming and focusing in the zoom lens system according to the present invention.

Since the lens arrangement is different between the zoom optical system and the macro optical system, there may be produced inconvenience from the viewpoint of lens barrel mechanism for setting the zoom lens system according to the present invention outside the ordinary zooming range from the wide position to the tele position. When the zoom optical system is into the macro optical system by using for example, a cam mechanism, moving loci having inflection points or abruptly varying shapes hinder smooth modification.

Let us consider a case wherein the macro optical system has a focal length which is equal to the zoom optical system at the tele position thereof and that the cam grooves for moving the lens units in the macro optical system are, beyond the tele position, continuous from the zooming cam grooves for the zoom optical system. It is desirable in this case that the conjugate relationship between the object point and the image point is varied little between the tele position of the zoom optical system and the macro optical system.

Figure 7:
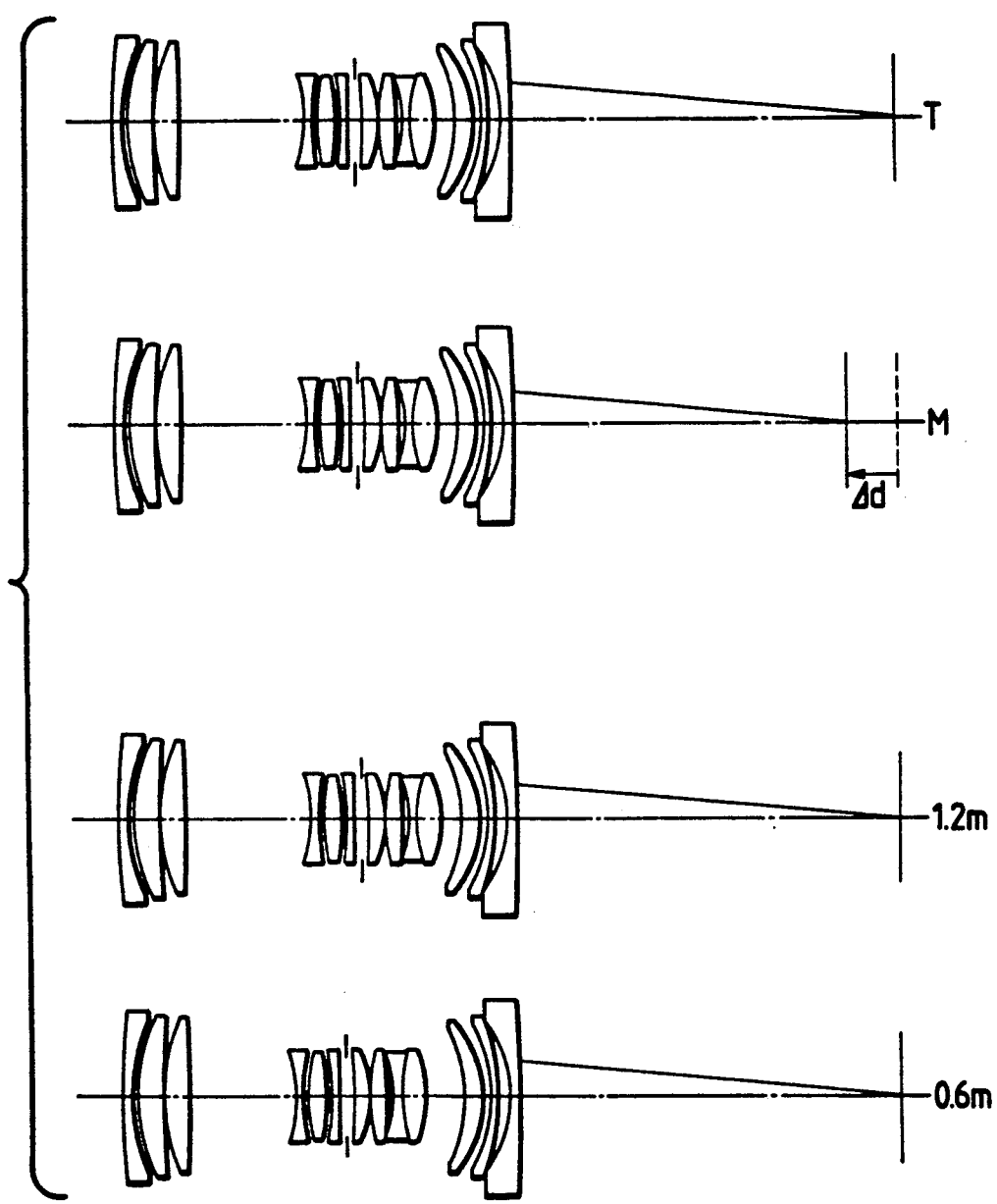
FIG. 7 shows sectional views illustrating the method for correcting defocused condition of the zoom lens system according to the present invention at the position thereof for photographing an object located at the exceptionally short distance.
Figure 8:
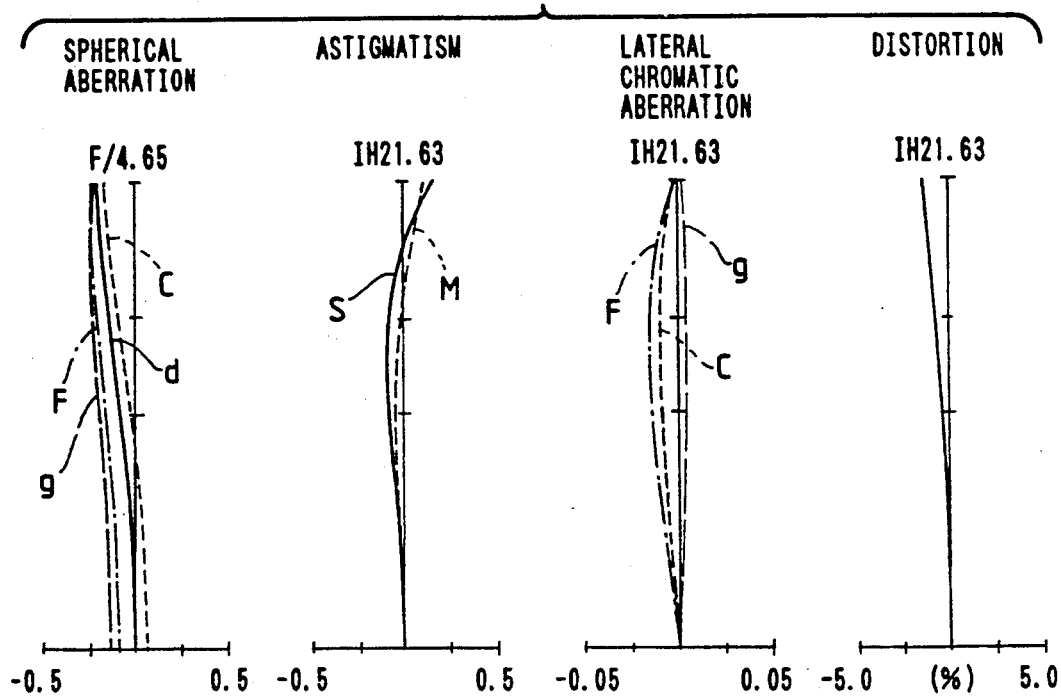
FIG. 8 shows curves illustrating aberration characteristics, for an object located at infinite distance, at the wide position of the Embodiment 1 of the present invention.
Figure 9:
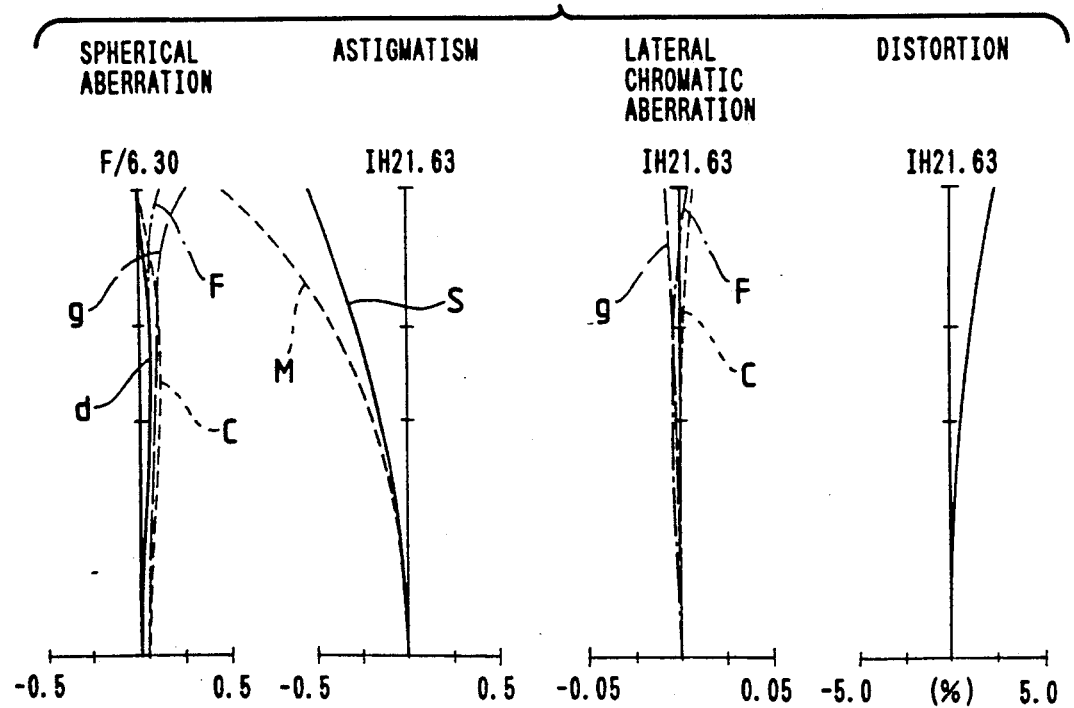
FIG. 9 shows curves illustrating aberration characteristics, for an object located at infinite distance, at the tele position of the Embodiment 1 of the present invention.
Figure 10:
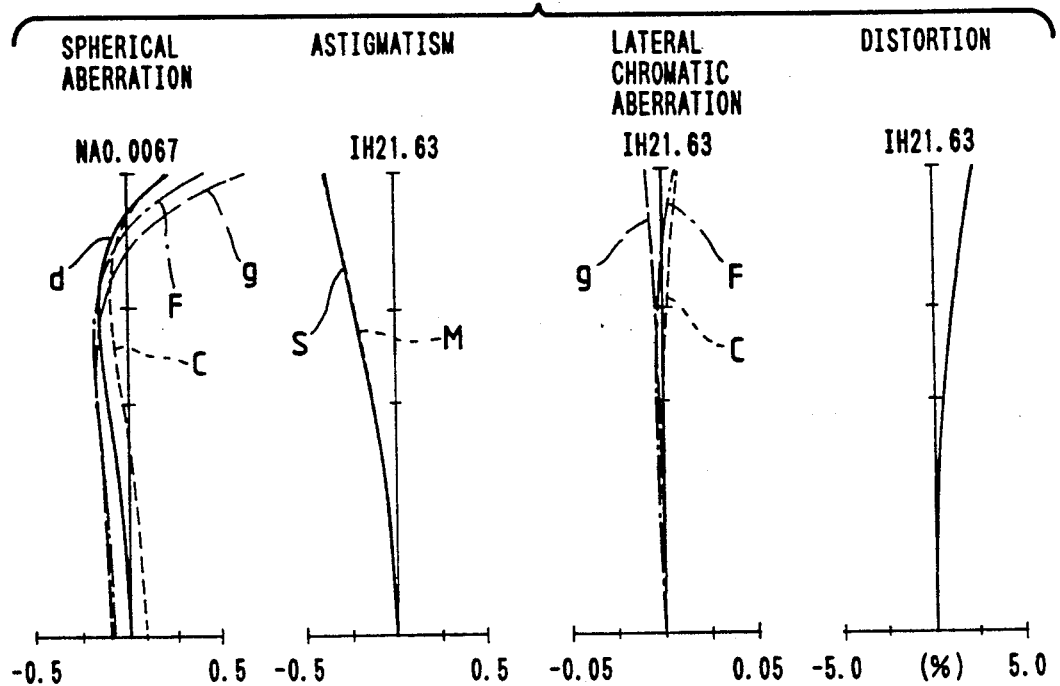
FIG. 10 shows curves illustrating aberration characteristics of the Embodiment 1 of the present invention for an object located at a distance of 1.2 m.
Figure 11:
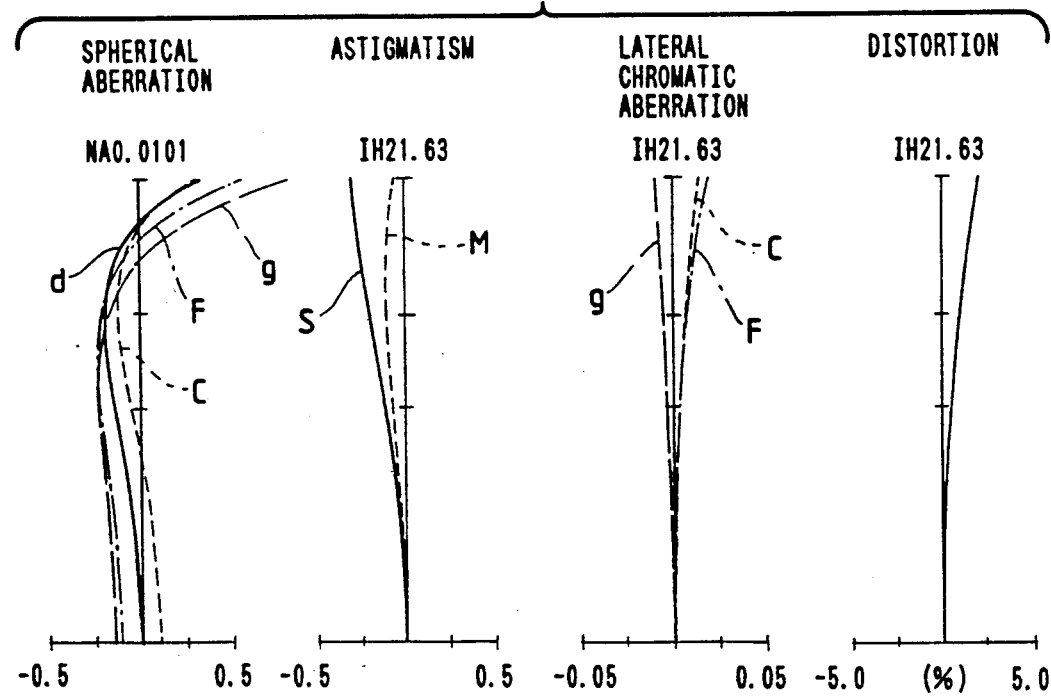
FIG. 11 shows curves illustrating aberration characteristics of the Embodiment 1 of the present invention for an object located at a distance of 0.6 m.
Figure 12:
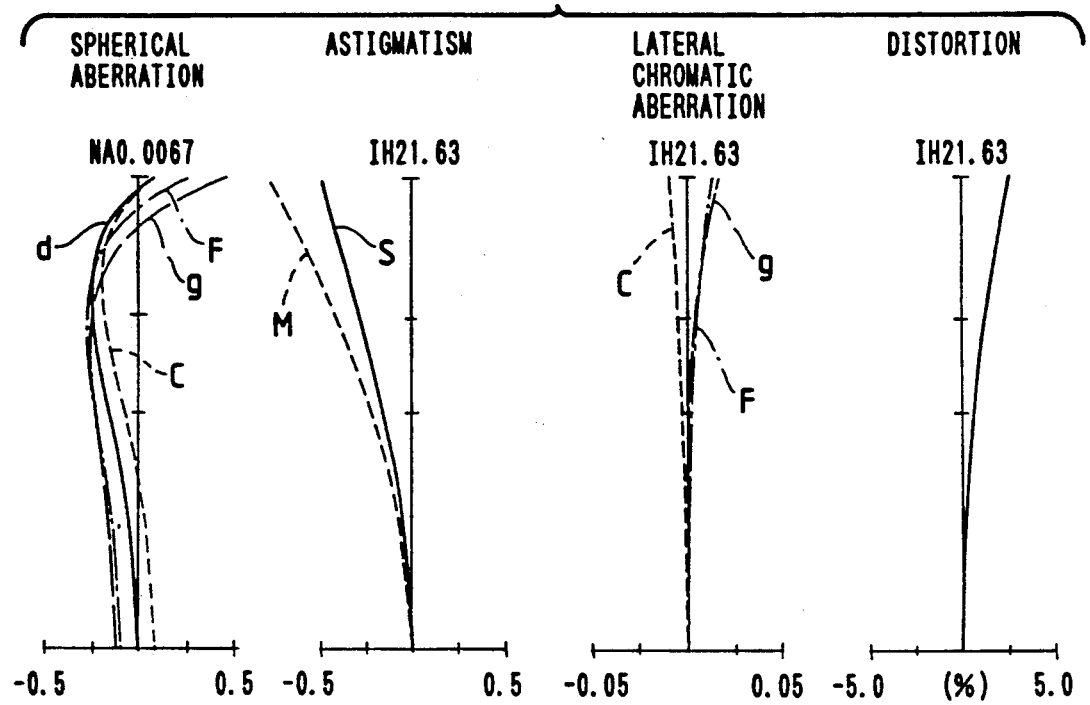
FIG. 12 shows graphs illustrating aberration characteristics of the Embodiment 2 of the present invention for an object located at a distance of 1.2 m.
Figure 13:
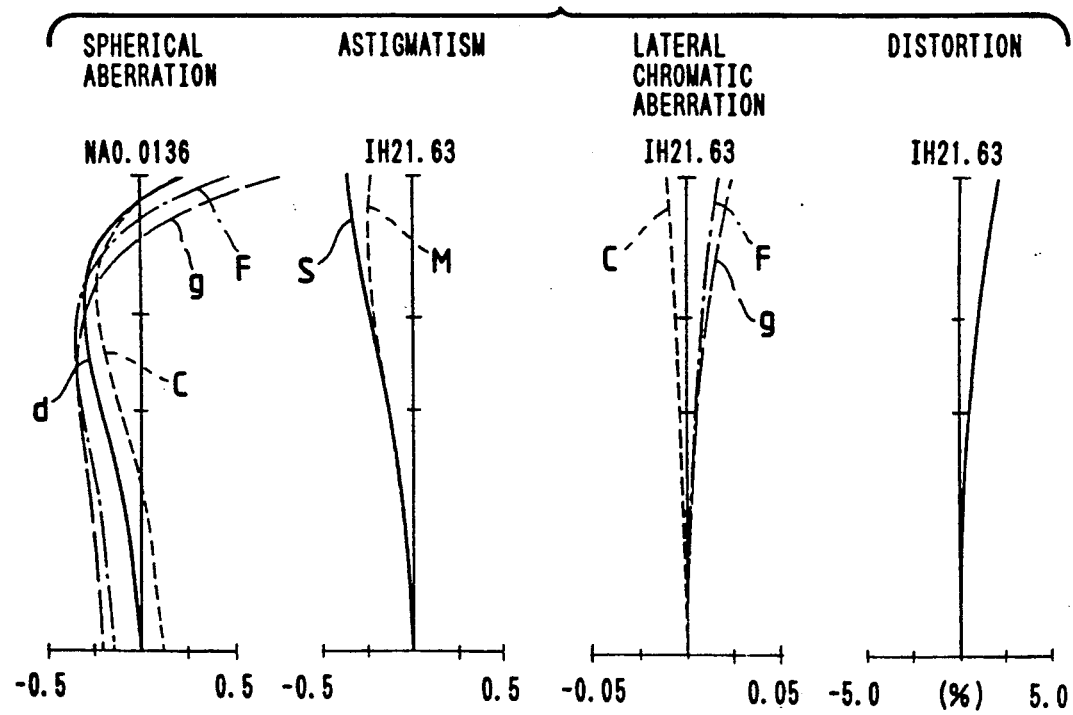
FIG. 13 shows graphs illustrating aberration characteristics of the Embodiment 2 of the present invention for an object located at a distance of 0.6 m.

Let us consider another case wherein the zoom optical system set at the tele position thereof has a total length which is the same as that of the macro optical system as shown in FIG. 7A through FIG. 7D. When the zoom optical system set at the tele position thereof shown in FIG. 7A is modified into the macro optical system illustrated in FIG. 7B, the image surface may be deviated from the optimum location and the macro optical system may be defocused. In the zoom lens system according to the present invention, the deviation of the image surface is corrected by moving the focusing lens unit as shown in FIG. 7C and FIG. 7D.

When the distance of the above-mentioned deviation is preliminarily known, the zoom optical system can be modified into the macro optical system by moving the lens units along loci including that required for moving the focusing lens unit for correction of the deviation. When the moving distance for correction of the deviation has a large absolute value and the focusing lens unit must be moved for a long distance in the macro optical system, however, the movements of the lens units described above are not desirable since such movements will cause variation of the optical performance.

Figure 24:
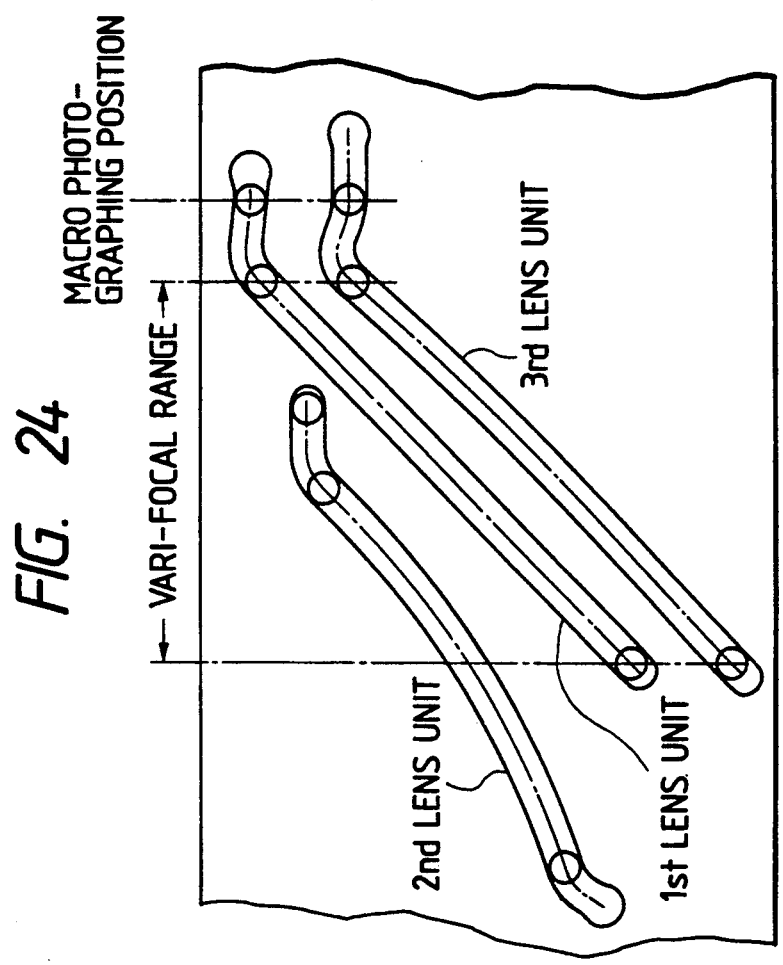
FIG. 24 shows a diagram illustrating cam grooves formed in a lens barrel for the zoom lens system according to the present invention.

FIG. 24 shows a development of the cam ring for the zoom lens system preferred as the Embodiment 4. As is seen from this drawing, the cam grooves in the macro optical system are formed as extentions from the zooming cam grooves in the zoom optical system.

Figure 25:
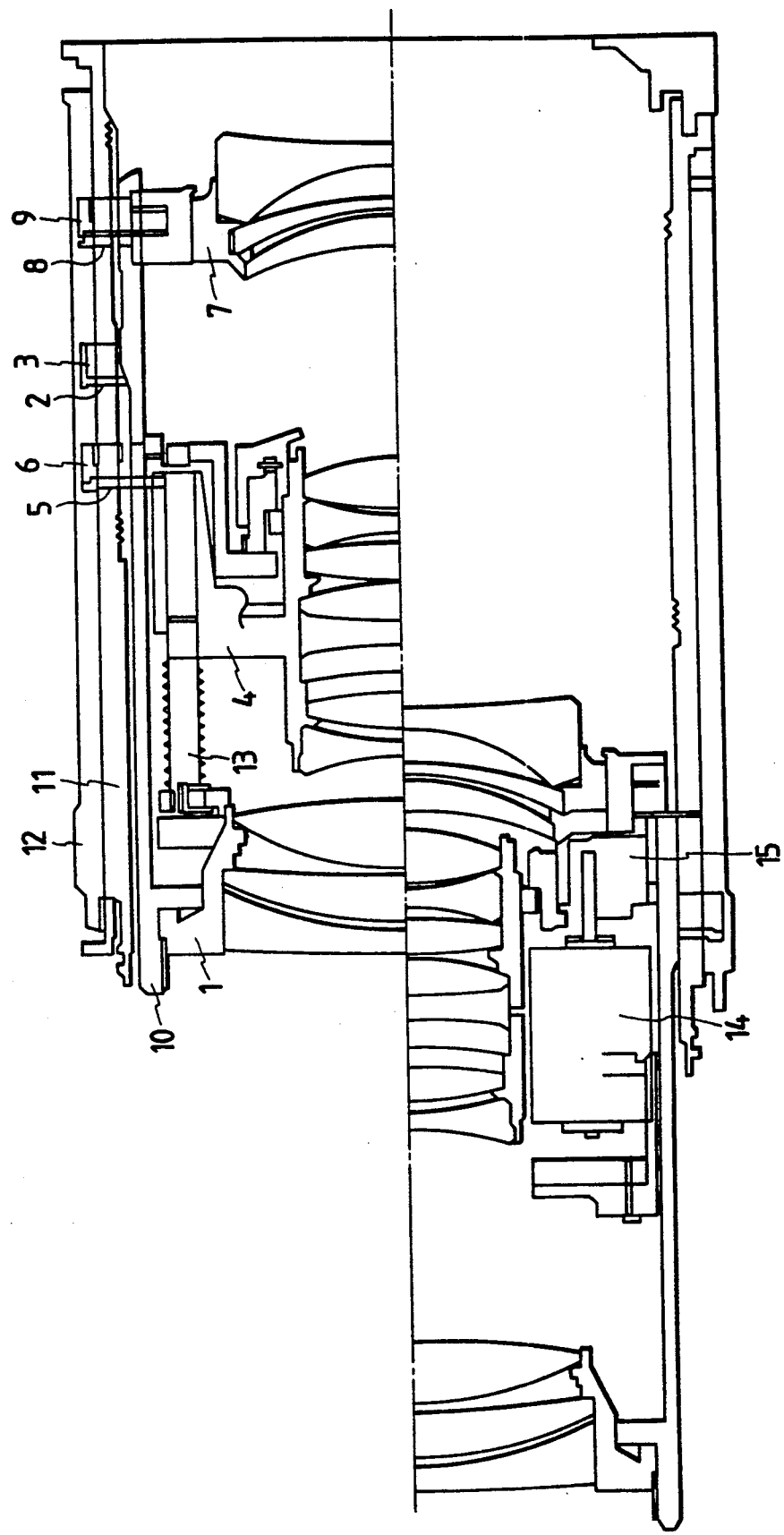
FIG. 25 shows a sectional view illustrating the lens barrel for the zoom lens system according to the present invention.

FIG. 25 shows a sectional view illustrating a structure of the lens barrel adopted for the Embodiment 4, the upper half of the sectional view showing a structure for lens arrangement at the wide position and the lower half showing a structure for lens arrangement in the macro optical system. In FIG. 25, the reference numeral 1 represents a lens frame for the first lens unit, the reference numeral 2 designates a cam groove for the first lens unit, the reference numeral 3 denotes a roller for the first lens unit, the reference numeral 4 represents a lens frame for the second lens unit, the reference numeral 5 designates a cam groove for the second lens unit, the reference numeral 6 denotes a roller for the second lens unit, the reference numeral 7 represents a lens frame for the third lens unit, the reference numeral 8 designates a cam groove for the third lens unit, the reference numeral 9 denotes a roller for the third lens unit, the reference numeral 10 represents a moving frame, the reference numeral 11 designates a fixed frame, the reference numeral 12 denotes a driving frame, the reference numeral 13 represents a rod for the second lens unit, the reference numeral 14 designates a driving motor for focusing and the reference numeral 15 denotes a gear train. The above-mentioned cam grooves are formed in the driving frame 12 shown in the drawing so that the ordinary zooming from the wide position to the tele position and the modification from the zoom optical system to the macro optical system can be performed by moving the lens units along the cam grooves with rotation of the driving frame 12.

Further, focusing is performed with driving motor for focusing which moves the focusing lens unit along the rod for the second lens unit for a distance determined on the basis of distance data.

Focusing is performed by storing reference data on moving distance for focusing into a non-volatile memory adopted as a memory means and outputting pulses in a number corresponding to the moving the distance determined by computation on the basis of the distance data.

Data on the focal length of the lens system is obtainable by detecting rotations of the driving frame 12 with an encoder mounted on the driving frame 12.

Figure 26:
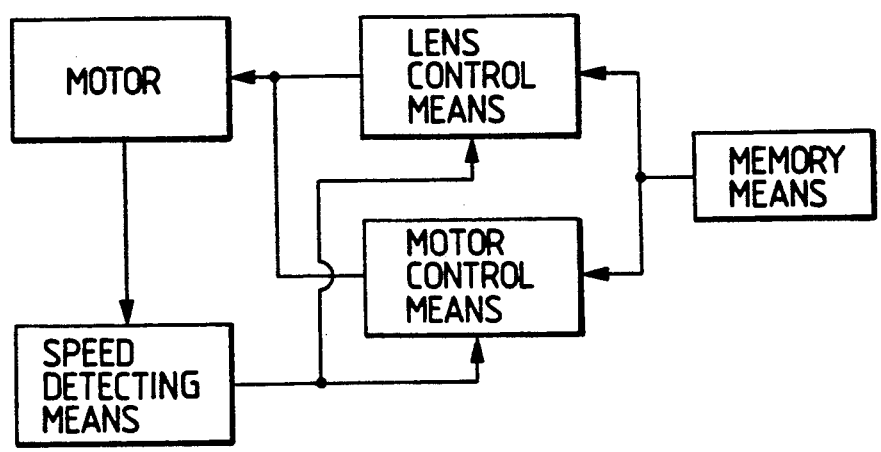
FIG. 26 and FIG. 27 show block diagrams illustrating a control system for the zoom lens system according to the present invention.
Figure 27:
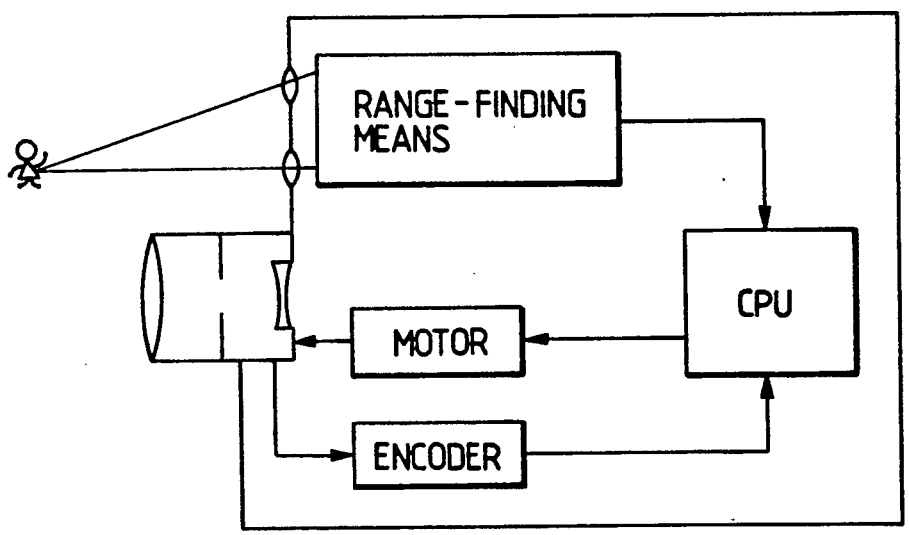

FIG. 26 and FIG. 27 show block diagrams of the functions for the controls described above, FIG. 26 being a block diagram of a CPU for controlling the motor. In FIG. 27, the distance measurement section is shown as the non-TTL type selected as a typical example. A speed detecting means for driving the motor detects rotating speed of the motor and functions to prevent the lens units from being moved insufficiently or excessively.

The zoom lens system according to the present invention is compatible, needless to say, with not only the autofocus system but also the manual focusing system.

The zoom lens system according to the present invention is usable, needless to say, as the zoom optical system and modifiable into the macro optical system having lens arrangement different from that of the zoom optical system so that the lens system permits photographing within the ordinary zooming range and photographing objects located at the exceptionally short distances with very high image qualities.

Further, the zoom lens system according to the present invention is compatible with simplified mechanical structure including a lens barrel since the macro optical system can be established by moving the lens units along loci which are continuous from the focusing loci. Moreover, deviation of the image surface caused by modifying the zoom optical system into the macro optical system can easily be adjusted by moving the focusing lens unit.

I claim:

1. A zoom lens system comprising:
   a plurality of lens units, including at least a lens unit having a positive refractive power for varying the focal length of the zoom lens system as a whole by movement of said lens unit, which has said positive refractive power, along a first locus including an optical axis; and
   a second locus different than said first locus for bringing objects located at exceptionally short distances into focus by movement of said lens unit, which has said positive refractive power, along said second locus;
   wherein said plurality of lens units includes a first lens unit having a positive refractive power, a second lens unit having a positive refractive power and a third lens unit having a negative refractive power, all of these lens units being movable along the optical axis for varying the focal length of the zoom lens system as a whole;
   wherein focal length of the zoom lens system as a whole is varied by varying the airspaces reserved between the lens units; and
   wherein said zoom lens system is focused for photographing objects located at exceptionally short distances by moving at least one of said lens units along a locus different from the locus thereof for varying the focal length.

2. A zoom lens system according to claim 1 wherein said second lens unit is moved for focusing on objects located at the exceptionally short distances.

3. A zoom lens system according to claim 2 wherein deviation of the image surface caused by the focusing on the objects located at the exceptionally short distance is corrected by moving said second lens unit.

4. A zoom lens system comprising:
   a plurality of lens units, including at least a lens unit having a positive refractive power for varying the focal length of the zoom lens system as a whole by movement of said lens unit, which has said positive refractive power, along a first locus including an optical axis; and
   a second locus different than said first locus for bringing objects located at exceptionally short distances into focus by movement of said lens unit, which has said positive refractive power, along said second locus;
   wherein said plurality of lens units includes a first lens unit having a positive refractive power, a second lens unit having a positive refractive power, and a third lens unit having a negative refractive power, all of these lens units being movable along the optical axis for varying the focal length of the zoom lens system as a whole;
   wherein focal length of the zoom lens system as a whole is varied by varying the airspaces reserved between the lens units; and
   wherein said zoom lens system is focused for photographing objects located at exceptionally short distances by moving said second lens unit along a locus different from the locus thereof for varying the focal length; and
   wherein said zoom lens system satisfies the following condition:

$$D_{2M} > D_{2T}$$

wherein the reference symbol $D_{2M}$ represents the airspace as measured on the optical axis between the second lens unit and the third lens unit when the lens system is focused on the objects located at the exceptionally short distances, and the reference symbol $D_{2T}$ designates the airspace as measured on the optical axis between the second lens unit and the third lens unit at the tele position.

5. A zoom lens system according to claim 4 satisfying the following condition:

$$f_1 \cdot \beta_{2M} \cdot \beta_{3M} < f_1 \cdot \beta_{2T} \beta_{3T}$$

wherein the reference symbol $f_1$ represents the focal length of the first lens unit, the reference symbols $\beta_{2T}$ and $\beta_{3T}$ designate the lateral magnifications of the second lens unit and the third lens unit respectively at the tele position, and the reference symbols $\beta_{2M}$ and $\beta_{3M}$ denote the lateral magnifications of the second lens unit and the third lens unit respectively when the lens system is focused on an object located at the exceptionally short distance.

6. A zoom lens system comprising, in order from the object side:
   a first lens unit;
   a second lens unit having a positive refractive power; and
   a third lens unit having a negative refractive power;
   wherein said zoom lens system is zoomed from a wide position thereof to a tele position thereof by moving at least one of said first, second and third lens units along the optical axis; and
   wherein objects located at exceptionally short distances are brought into focus for photographing by moving said at least one lens units along a locus different from a locus thereof for zooming from the wide position to the tele position.

7. A zoom lens system according to claim 6, wherein said first lens unit has a positive refractive power.

8. A zoom lens system comprising a plurality of lens units;
wherein said system is zoomed from a wide position thereof to a tele position thereof by moving at least one of said lens units toward the object side along the optical axis; and
wherein objects located at exceptionally short distances are brought into focus for photographing by moving said at least one lens unit toward the object side from the location thereof at the tele position along a locus different from a locus thereof for zooming from the wide position to the tele position.

9. In a cam grooves mechanism for a zoom lens system including a plurality of lens units and formed to be zoomed from a wide position to a tele position by moving at least one of said lens units along the optical axis;
said cam grooves mechanism allowing objects located at exceptionally short distances to be brought into focus for photographing by moving said at least one lens unit along a locus formed beyond the tele position so as to be different from the locus of the cam grooves for zooming from the wide to the tele position.

10. A cam grooves mechanism according to claim 9, wherein said plurality of lens units include a first, second and third lens unit, and said at least one lens unit si said second lens unit.

11. A zoom lens system consisting of a first lens unit having a positive refractive power, a second lens unit having a positive refractive power, and a third lens unit having a negative refractive power, all of these lens units being movable along the optical axis for varying the focal length of the zoom lens system as a whole;
wherein focal length of the zoom lens system as a whole is varied by varying the airspaces reserved between the lens units; and
wherein said zoom lens system is focused for photographing objects located at exceptionally short distances by moving at least one of said lens units along a locus different from a locus thereof for varying the focal length.

* * * * *